United States Patent
Alperin et al.

(10) Patent No.: US 7,676,473 B2
(45) Date of Patent: Mar. 9, 2010

(54) PROPAGATION OF USER PREFERENCES TO END DEVICES

(75) Inventors: Jordan Alperin, Denver, CO (US); Rich Cerami, Denver, CO (US)

(73) Assignee: Qwest Communications International, Inc., Denver, CO (US)

( * ) Notice: Subject to any disclaimer, the term of this patent is extended or adjusted under 35 U.S.C. 154(b) by 125 days.

(21) Appl. No.: 11/293,028

(22) Filed: Dec. 2, 2005

(65) Prior Publication Data

US 2007/0130155 A1 Jun. 7, 2007

(51) Int. Cl.
G06F 7/00 (2006.01)
G06F 17/30 (2006.01)

(52) U.S. Cl. ......................................... 707/10
(58) Field of Classification Search .................... 707/10, 707/9
See application file for complete search history.

(56) References Cited

U.S. PATENT DOCUMENTS

| | | | |
|---|---|---|---|
| 5,410,691 A | 4/1995 | Taylor | |
| 5,633,484 A | 5/1997 | Zancho et al. | |
| 5,974,449 A | 10/1999 | Chang et al. | |
| 6,014,429 A | 1/2000 | LaPorta et al. | |
| 6,421,733 B1 | 7/2002 | Tso et al. | |
| 6,442,606 B1 | 8/2002 | Subbaroyan et al. | |
| 6,556,217 B1* | 4/2003 | Makipaa et al. | 345/667 |
| 6,564,264 B1 | 5/2003 | Creswell et al. | |
| 6,694,004 B1 | 2/2004 | Knoerle | |
| 6,782,253 B1* | 8/2004 | Shteyn et al. | 455/414.1 |
| 6,799,174 B2* | 9/2004 | Chipman et al. | 707/3 |
| 6,816,582 B2 | 11/2004 | Levine | |
| 6,826,173 B1* | 11/2004 | Kung et al. | 370/352 |
| 6,832,259 B2* | 12/2004 | Hymel et al. | 709/229 |
| 6,879,838 B2* | 4/2005 | Rankin et al. | 455/456.6 |
| 6,882,709 B1 | 4/2005 | Sherlock et al. | |
| 6,938,087 B1 | 8/2005 | Abu-Samaha | |
| 7,013,331 B2* | 3/2006 | Das | 709/220 |
| 7,072,056 B1* | 7/2006 | Greaves et al. | 358/1.15 |
| 7,188,073 B1 | 3/2007 | Tarn et al. | |
| 7,212,543 B1 | 5/2007 | Arwald et | |
| 7,219,163 B2* | 5/2007 | Robinson et al. | 709/246 |
| 7,224,774 B1 | 5/2007 | Brown et al. | |
| 7,272,662 B2 | 9/2007 | Chesnais et al. | |
| 7,385,875 B2 | 6/2008 | May et al. | |
| 2002/0075519 A1 | 6/2002 | Konsella et al. | |
| 2002/0098831 A1 | 7/2002 | Castell et al. | |

(Continued)

OTHER PUBLICATIONS

U.S. Appl. No. 11/228,446, filed Sep. 15, 2005, Jordan Alperin.

(Continued)

*Primary Examiner*—Jean B. Fleurantin
*Assistant Examiner*—Aleksandr Kerzhner (57) ABSTRACT

In one embodiment, a method of providing propagation of user preferences to multiple end devices can comprise receiving a request for user preference information, the request originating from a requesting end device. One or more sewers storing preference information for a user associated with the requesting end device can be identified. The preference information for the user associated with the requesting end device can be read from the one or more servers and a response message can be generated. The response message can include the preference information for the user associated with the requesting end device from the one or more servers. The response message can be sent to one or more recipient end devices.

14 Claims, 5 Drawing Sheets

U.S. PATENT DOCUMENTS

| | | | |
|---|---|---|---|
| 2002/0102965 A1* | 8/2002 | Mandahl et al. | 455/412 |
| 2002/0128036 A1 | 9/2002 | Yach et al. | |
| 2002/0194150 A1 | 12/2002 | Bates et al. | |
| 2003/0088633 A1* | 5/2003 | Chiu et al. | 709/206 |
| 2003/0147369 A1* | 8/2003 | Singh et al. | 370/338 |
| 2003/0149646 A1* | 8/2003 | Chen et al. | 705/35 |
| 2003/0172139 A1* | 9/2003 | Srinivasan et al. | 709/221 |
| 2003/0172175 A1* | 9/2003 | McCormack et al. | 709/232 |
| 2004/0054719 A1* | 3/2004 | Daigle et al. | 709/203 |
| 2004/0058673 A1 | 3/2004 | Irlam et al. | |
| 2004/0268265 A1 | 12/2004 | Berger | |
| 2005/0015443 A1 | 1/2005 | Levine et al. | |
| 2005/0053206 A1 | 3/2005 | Chingon et al. | |
| 2005/0075097 A1 | 4/2005 | Lehikoinen et al. | |
| 2005/0086282 A1 | 4/2005 | Anderson et al. | |
| 2005/0089149 A1 | 4/2005 | Elias | |
| 2005/0246666 A1 | 11/2005 | Kalinoski et al. | |
| 2006/0095868 A1 | 5/2006 | Sawada et al. | |
| 2006/0104430 A1 | 5/2006 | Kirkland et al. | |
| 2006/0104431 A1 | 5/2006 | Emery et al. | |
| 2006/0123082 A1 | 6/2006 | Digate et al. | |
| 2006/0156251 A1 | 7/2006 | Suhail et al. | |
| 2006/0168065 A1 | 7/2006 | Martin | |
| 2006/0250991 A1 | 11/2006 | Jabri et al. | |
| 2006/0265397 A1 | 11/2006 | Bryan et al. | |
| 2007/0016643 A1 | 1/2007 | Boss et al. | |
| 2007/0097394 A1 | 5/2007 | Zaima et al. | |
| 2007/0239880 A1 | 10/2007 | Alperin et al. | |
| 2007/0239895 A1 | 10/2007 | Alperin et al. | |

OTHER PUBLICATIONS

U.S. Appl. No. 11/255,089, filed Oct. 19, 2005, Jordan Alperin et al.
U.S. Appl. No. 11/266,011, filed Nov. 2, 2005, Jordan Alperin et al.
U.S. Appl. No. 11/292,801, filed Dec. 2, 2005, Jordan Alperin et al.
U.S. Appl. No. 11/399,096, filed Apr. 5, 2006, Jordan Alperin et al.
U.S. Appl. No. 11/399,585, filed Apr. 5, 2006, Jordan Alperin et al.
U.S. Appl. No. 11/399,097, filed Apr. 5, 2006, Jordan Alperin et al.
U.S. Appl. No. 11/399,098, filed Apr. 5, 2006, Jordan Alperin et al.
U.S. Appl. No. 11/399,584, filed Apr. 5, 2006, Jordan Alperin.
U.S. Appl. No. 11/400,643, filed Apr. 6, 2006, Jordan Alperin et al.
U.S. Appl. No. 11/400,616, filed Apr. 6, 2006, Jordan Alperin et al.
U.S. Appl. No. 11/400,644, filed Apr. 6, 2006, Jordan Alperin et al.
U.S. Appl. No. 11/383,620, filed May 16, 2006, Jordan Alperin.
The Web Design Resource, "Manipulating Font Size and Color", Jun. 27, 1998, The Web Design Resource, 2 pgs.
U.S. Appl. No. 11/228,446, Office Action dated Jun. 3, 2008, 13 pgs.
U.S. Appl. No. 11/228,446, Final Office Action dated Oct. 24, 2008, 6 pgs.
U.S. Appl. No. 11/228,446, Advisory Action dated Jan. 8, 2009, 3 pgs.
U.S. Appl. No. 11/228,446, Office Action dated Mar. 3, 2009, 12 pgs.
U.S. Appl. No. 11/228,446, Final Office Action dated Jul. 24, 2009, 11 pgs.
U.S. Appl. No. 11/228,446, Advisory Action dated Oct. 1, 2009, 3 pgs.
U.S. Appl. No. 11/399,096, Office Action dated Jan. 22, 2009, 14 pgs.
U.S. Appl. No. 11/399,096, Final Office Action dated Jun. 17, 2009, 11 pgs.
U.S. Appl. No. 11/399,585, Office Action dated Mar. 24, 2009, 17 pgs.
U.S. Appl. No. 11/266,011, Office Action dated Dec. 22, 2008, 16 pgs.
U.S. Appl. No. 11/266,011, Office Action dated Jun. 10, 2009, 14 pgs.
U.S. Appl. No. 11/399,098, filed Apr. 5, 2006, now US Patent No. 7,596,369, 38 pgs.
U.S. Appl. No. 11/400,643, Office Action dated Jan. 9, 2009, 18 pgs.
U.S. Appl. No. 11/400,643, Final Office Action dated Jul. 27, 2009, 17 pgs.
U.S. Appl. No. 11/400,616, Office Action dated Jul. 13, 2009, 21 pgs.
U.S. Appl. No. 11/400,644, Office Action dated Jan. 21, 2009, 16 pgs.
U.S. Appl. No. 11/292,801, Office Action dated Mar. 3, 2009, 13 pgs.
U.S. Appl. No. 11/399,098, Response to Election/Restriction dated Mar. 11, 2009.
U.S. Appl. No. 11/255,089, OA Non-Final Rejection dated Oct. 8, 2008.
U.S. Appl. No. 11/255,089, OA Non-Final Rejection dated Mar. 10, 2009.
U.S. Appl. No. 11/399,098, OA Non-Final Rejection dated Aug. 25, 2008.
U.S. Appl. No. 11/399,098, Notice of Allowance dated Jun. 2, 2009.
U.S. Appl. No. 11/399,098, Office Action Requirement for Restriction/Election dated Feb. 25, 2009.
U.S. Appl. No. 11/255,089, Response After Non-Final Action dated Jan. 7, 2009.
U.S. Appl. No. 11/255,089, Response After Non-Final Action dated Jun. 10, 2009.
U.S. Appl. No. 11/399,098, Response after Non-Final Action dated Nov. 25, 2008.
U.S. Appl. No. 11/399,098, Terminal Disclaimer dated Nov. 25, 2008.
U.S. Appl. No. 11/228,446, Office Action dated Jul. 24, 2009, 11 pg.
Alan Koontz, "Find in Page Script", Oct. 13, 1969, Dynamic Drive, "http:/www.dynamicdrive.com/dynamicindex11/findpage.htm", all pages.

* cited by examiner

PROPAGATION OF USER PREFERENCES TO END DEVICES

CROSS REFERENCE TO RELATED APPLICATIONS

This application is related to co-pending U.S. patent application Ser. No. 11/255,089 entitled "Cross-Platform Support for a Variety of Media Types" filed Oct. 19, 2005, that is herein incorporated by reference.

BACKGROUND OF THE INVENTION

Embodiments of the present invention relate generally to communications networks and more particularly to providing for propagation of user preferences to multiple end devices of potentially diverse types.

Today it is very common, and probably the norm, for an individual to have and regularly use a number of communications devices of different types that communicate via a variety of different media. For example, an individual may, on a daily basis, use a number of different telephones such as a work line, a home line, one or more cell phones, etc. Additionally, this same individual may have and use a number of other communications devices and/or media such as one or more email accounts, one or more instant message accounts, etc. that are accessible through any of a number of different devices such as personal computers various portable devices, and/or other network attached devices that communicate via the Internet or other network.

While the availability of these devices helps people stay in touch and communicate, it can present problems. For one, each device has its own settings and/or user defined preferences. However, an individual using a number of communication devices may have some user preference settings that he wants to set on all of his devices. For example, a user may wish to temporarily set a "theater" mode or "do not disturb" mode on more than one device such as his cell phone, pager, etc. In another example, the user may want to have the same settings, greetings, etc. applied to all of his voice mailboxes.

Currently, there is no way for a user of multiple end devices of different types to share or set user preferences that are common to all or some subset of all of these devices. Rather, the user is left with the tedious and time consuming task of setting these preferences individually in each device. Hence, there is a need for methods and systems that allow for propagation of user preference information across multiple devices of potentially diverse types.

BRIEF SUMMARY OF THE INVENTION

Systems, methods, and machine-readable media are disclosed to provide propagation of user preferences to multiple end devices of potentially diverse types. In one embodiment, a method of providing propagation of user preferences to multiple end devices can comprise receiving a request for user preference information, the request originating from a requesting end device. One or more servers storing preference information for a user associated with the requesting end device can be identified. The preference information for the user associated with the requesting end device can be read from the one or more servers and a response message can be generated. According to one embodiment, generating a response message can comprise generating a common language message readable by a plurality of end devices of different type such as, for example, an eXtensible Markup Language (XML) file. The response message can include the preference information for the user associated with the requesting end device from the one or more servers. The response message can be sent to one or more recipient end devices. The one or more recipient end devices can include the requesting end device.

According to one embodiment, the method can further comprise identifying a user associated with the requesting end device prior to identifying one or more servers storing preference information for the user associated with the requesting end device. In such a case, identifying one or more servers storing preference information for the user associated with the requesting end device can be based on identifying the user associated with the requesting end device.

According to another embodiment, the preference information for the user associated with the requesting end device can comprise general preference information applicable to multiple end devices associated with the user associated with the requesting end device and/or specific preference information applicable to the requesting end device. In some cases, the method can include determining whether there is specific preference information for the user associated with the requesting end device stored in the one or more servers. In such a case, generating the response message and sending the response message can be performed in response to determining there is specific preference information for the user associated with the requesting end device stored in the one or more servers.

According to yet another embodiment, the one or more recipient end devices can update user preference information stored therein based on the response message. In some cases, the method can include translating the common language message to a format specific to each of the one or more recipient end devices prior to updating the user preference information on the one or more recipient end devices.

According to still another embodiment, a system for providing cross-platform message notification can comprise a communications bus and a plurality of end devices of different types. Each end device can be communicatively coupled with the communications bus and can be adapted to send and receive common language messages via the communications bus and to translate common language messages received from the communications bus to a format specific to the end device based on the type. The system can also include a plurality of servers adapted to provide services and information to the plurality of end devices and to store user preference information and one or more managers. Each manager can be communicatively coupled with the communications bus and at least one of the plurality of servers. Each manager can be adapted to receive, via the communications bus, a request for user preference information. The request can originate from a requesting end device of the plurality of end devices. The managers can identify one or more servers from the plurality of servers storing preference information for a user associated with the requesting end device and read the preference information for the user associated with the requesting end device from the one or more servers. The manager can generate a response message including the preference information for the user associated with the requesting end device from the one or more servers and send the response message to one or more recipient end devices via the communications bus.

According to yet another embodiment, a machine-readable medium can have stored thereon a series of instruction which, when executed by a processor, cause the processor to propagate user preferences to one or more end devices by receiving a request for user preference information, the request originating from a requesting end device. One or more servers storing preference information for a user associated with the requesting end device can be identified. The preference information for the user associated with the requesting end device can be read from the one or more servers. A response message including the preference information for the user associated with the requesting end device from the one or more servers can be generated and sent to one or more recipient end devices.

DETAILED DESCRIPTION OF THE INVENTION

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

Embodiments of the present invention provide methods, system and machine-readable media for propagating user preference settings to one or more end devices of potentially diverse types. Embodiments of the present invention utilize a common interface layer, such as that described in the above referenced application titled "Cross-Platform Support for a Variety of Media Types" that provides a generic transport for communications of various media types and connection of various services with a variety of end devices and/or platforms. Such a generic transport provides a means through which device settings, such as user preference settings, can be propagated to multiple end devices.

Figure 1:
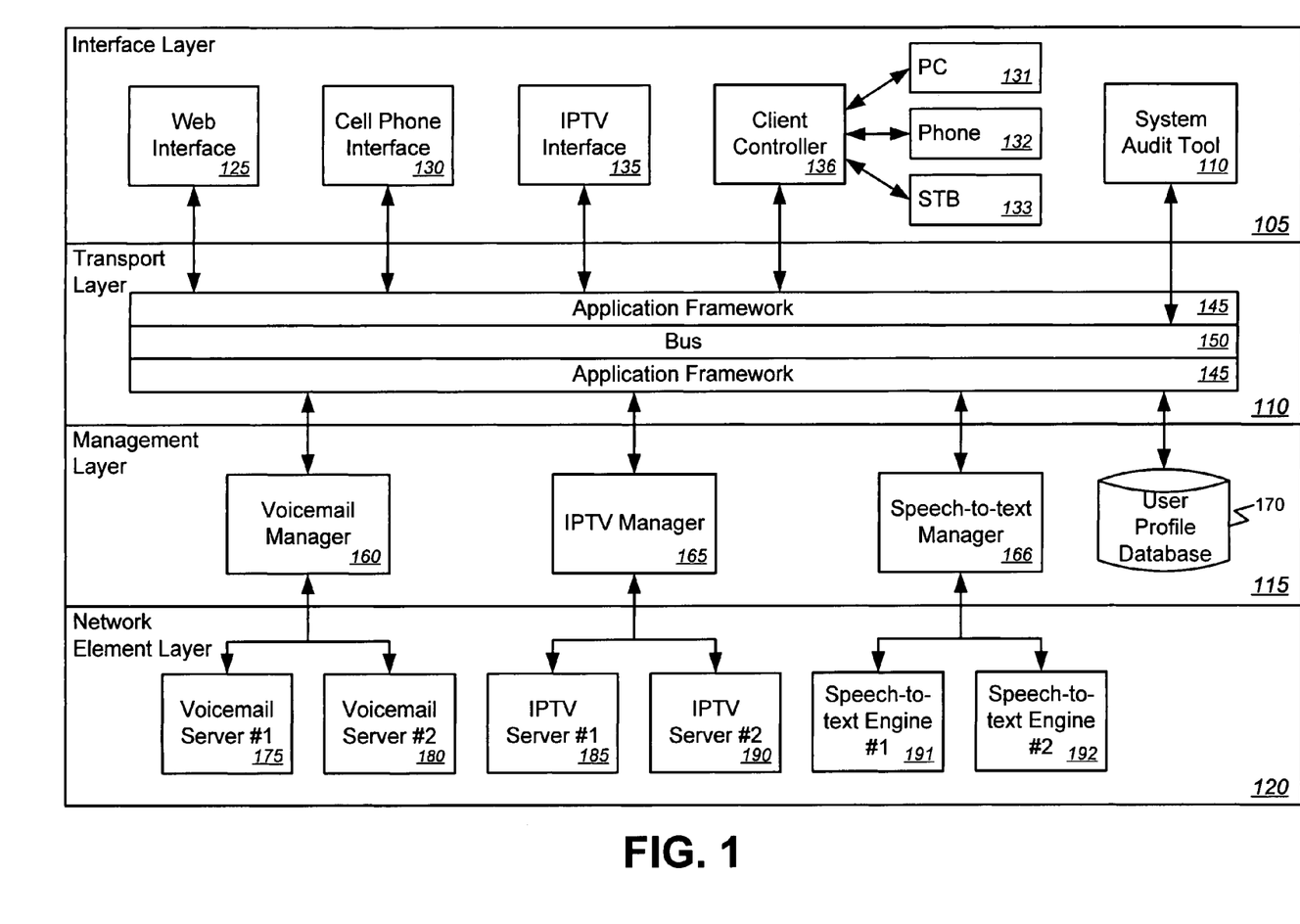
FIG. 1 is a block diagram illustrating, at a high-level, functional components of an architecture for providing propagation of user preferences to multiple end devices of potentially diverse types according to one embodiment of the present invention.

FIG. 1 is a block diagram illustrating, at a high-level, functional components of an architecture for providing propagation of user preferences to multiple end devices of potentially diverse types according to one embodiment of the present invention. In this example, the architecture is logically divided into four layers 105-120. The layers 105-120 include a network element layer 120, a management layer 115, a transport layer 110, and an interface layer 105. As will be seen, elements of each layer 105-120 can be communicatively coupled with elements of the next layer 105-120. So, elements of the network element layer 120 can be communicatively coupled with elements of the management layer 115 which in turn can be communicatively coupled with elements of the transport layer 110, etc.

The network element layer 120 can comprise one or more servers 175-192. The servers 175-192 of the network element layer 120 can each provide content and/or services of one or more types. For example, one or more servers 175 and 180 may provide voicemail services while one or more other servers 185 and 190 provide Television (TV) services, while yet other servers 191 and 192 provide speech-to-text services, etc. Importantly, while this example shows a limited number of servers 175-192 in the network element layer 120, many more servers, providing a wide range of content or services of various types may be included. For example, one or more servers may be included for providing Internet services, Email services, and various other types of data, communication, and/or entertainment services.

The management layer 115 can comprise one or more managers 160-166. Each manager 160-166 can be communicatively coupled with one or more of the servers 175-192 of the network element layer 120. For example, voicemail manager can be coupled with voicemail servers 175 and 180 while TV manager 165 can be coupled with TV servers 185 and 190. Importantly, while managers 160-166 and servers 175-192 are shown and described herein as being organized by or arranged per service, other arrangements are contemplated and considered to be within the scope of the present invention. According to one alternative, the managers 160-166 and the servers 175-192 may be arranged by company or provider. So, for example, one manager may be coupled with and provide access to the services and content provided by the servers of company A while another manager may be coupled with and provide access to the services and content provided by the servers of company B. However, an arrangement of managers 160-166 and servers 175-192 based on service and/or content type may be preferable since, as will be seen, such an arrangement can provide for easier extensibility of the system when adding features or services.

Furthermore, as noted above, additional servers may be used in the network element layer providing additional services and/or content of different types. Therefore, more, fewer, or different managers than shown in this example may be used in an actual implementation. For example an additional manager may be used for interfacing with one or more servers providing Internet services or email services. In another example, one or more managers may be communicatively coupled with one or more servers tracking billable events on the architecture. That is, one manager may track calls, messages, events, or pay-per-view or other content billed on a per-use basis so that the appropriate users can be billed by the operator of the architecture, the provider of the content, and/or other parties.

Regardless of the exact number, nature, or organization of the servers 175-192 and managers 160-166, the managers 160-166 can be adapted to translate content of the servers 175-192 with which the manager 160-166 is connected from the media types of the servers 175-192 to one or more common language messages. That is, the managers 160-166 can provide translation from a service specific format to a common or generic format. For example, voicemail server #1 175 and voicemail server #2 180 may be operated by different entities and offer different information in different formats that may be completely incompatible with each other. However, voicemail manager 160 provides for translating these different functions, formats, etc into a common language message that can be used by all other elements of the architecture. Additionally, as will be discussed in detail below, the managers 160-166 can be adapted to read user preference information stored on or by the servers 175-192 and/or user profile database 170 and generate common language messages for propagating preference settings to various end devices.

According to one embodiment of the present invention, the managers 160-166 can provide defined interfaces to the servers 175-192 of the network element layer 120. By using calls, invocations, requests, or other signals or messages to the managers 160-166, the servers 175-192 can pass content or messages to the managers 160-166 for translation to a common language message for transmission to another element of the architecture. For example, voicemail manager 160 may provide an Application Program Interface (API) for use by any voicemail server 175 and 180 connected with the voicemail manager 160. Voicemail servers 175 and 180 can then use API calls to the voicemail manager 160 to initiate services, pass content or other information, and/or otherwise communicate with the voicemail server 160. According to one embodiment of the present invention, calls to the API or other interface may be closely analogous to the common language messages generated by the manager. For example, the manager may generate "InitiateCommunication" message to initiate a communication. The manager's API may also provide a "InitiateCommunication" or other similar call to the servers to which it is connected through which the servers can initiate a communication.

While use of an API or other defined interface between the managers 160-166 and the servers 175-192 is not required, it may be preferred since, by using an API or other type of defined interface, the managers 160-166 can be easily extended or modified as services and/or content of the servers are added or changed or as new servers are added. That is, the use of a defined interface such as an API allows greater extensibility since the only changes made at the manager would be to add or modify an appropriate "stub," module, or routine to add a new server, service, or content type without a need to make wholesale changes or re-write the managers.

According to one embodiment of the present invention, the manager and the API or interface of the manager may be implemented using object-oriented programming techniques. In such a case, the manager API calls made by the servers can cause the stub or module of the manager interfacing with the server to instantiate an object of a particular class type, such as a "InitiateCommunication" object, with properties representing, among other possibilities, the content of data to be communicated, the intended recipient(s), etc. Such an object or common language message may be defined in a common format readable by other elements of the architecture. For example, the object may be defined in an eXtensible Markup Language (XML) file. The manager can then transmit this object or common language message to any or all of the other elements of the architecture via the transport layer 110.

The transport layer 110 can comprise a communications bus 150 communicatively coupled with each of the managers 160-166. The bus 150 can be adapted to receive and transport the one or more common language messages from the managers 160-166. The transport layer 110 can also comprise an optional application framework 145 interposed between the end devices 125-136 of the interface layer 105 and the communications bus 150 and between the managers 160-166 and the communications bus 150. Generally speaking, the application framework 145 provides for monitoring and tracking of the common language messages placed on the bus 150 of the transport layer 110.

Regardless of whether the application framework 145 is used, the bus 150 of the transport layer 110 comprises a common representation of data that is usable by all elements of the architecture. Furthermore, the bus 150 provides this message to any or all devices in the architecture as appropriate regardless of the type of device.

According to one embodiment of the present invention, the bus 150 may also be implemented using object-oriented programming techniques. In such a case, a manager placing or sending a common language message on the bus 150 can call or invoke an API or other interface of the bus 150 or otherwise cause the instantiation of an object of a particular class type, such as a "InitiateCommunication" object, with properties representing, among other possibilities, the content of data to be communicated, the intended recipient(s), etc. The bus can then make this object or common language message available to any or all of the other elements of the architecture.

The interface layer 105 of the architecture can comprise one or more end devices 125-136 of different types. For example, the end devices 125-136 can represent a cell phone 130, a web browser 125, a TV interface 135, etc all potentially operating on different platforms with different operating systems. Each end device 125-136 can be communicatively coupled with the bus 150 of the transport layer, either directly or via the application framework 145, and can be adapted to receive and translate the common language messages to a format specific to the end device based on its type.

Alternatively or additionally, one or more of the end devices may comprise a client controller 136 communicatively coupled with the bus 150 of the transport layer 110 and one or more other end devices 131-133 such as a personal computer 131, television Set-Top Box (STB) 133 for television service, telephone 132, or other type of device. If used, the client controller 136 can be adapted to receive common language messages from the bus 150, translate content from the common language messages to a format specific to the end device(s) 131-133 for which it is intended, and deliver the device specific message to the device or devices. In some cases, the client controller 136 may also be adapted to act as a firewall for end devices 131-133 communicating via the bus 150 of the transport layer 110.

Therefore, the end devices 125-136 can translate from the common language messages, such as an XML message, to device specific representations of the information in that message for presentation to user in whatever format that device uses. According to one embodiment, the translation functions of the end devices can also be implemented using object-oriented programming techniques. In such a case, the end devices receive the common language messages such as XML encoded representations of the objects on the bus 150 of the transport layer 110. Translation can therefore comprise instantiating on the end device an object of the class indicated by the message with the properties indicated by the message thereby translating the properties of the object on the bus to a presentation language of the device.

Thus far, the description of the architecture has focused on messages from the servers 175-192 to the end devices 125-136. However, the end devices 125-136 can also be adapted to generate one or more common language messages based on user input and send the one or more common language messages to one or more of the managers 160-165 via the bus 150. For example, a cell phone 130 or other end device 125-136 can generate a "InitiateCommunication" message to be sent to any or all of the managers 160-165 or even to another end device. Therefore, the managers 160-165 can be further adapted to receive the common language messages from the end devices 125-136 via the bus 150 and to translate the common language messages to content of the media type of the servers 175-192 with which the manager 160-166 is connected.

According to one embodiment of the present invention, the architecture can include a user profile database 170 communicatively coupled with the bus 150 of the transport layer. The user profile database 170 can be adapted to maintain records of a set of user preferences for one or more of the end devices 125-136 of the interface layer 105. For example, TV or cell phone settings or options for a particular device and/or a particular user can be stored in the user profile database 170 for retrieval by one or more of the end devices 125-136 or one or more of the managers 160-166. Therefore, the user profile database 170 can be adapted to provide the preferences to one or more of the end devices 125-136 or one or more of the managers 160-166 in response to a common language message received via the bus 150. According to one embodiment and as will be discussed in detail below, user preference information can comprise specific preference information applicable to a particular type of service, data, and/or device, etc. and general preference information applicable to multiple types of services, data, and/or devices, etc. According to one embodiment, general preference information may be stored in the user profile database 170 while specific preference information may be stored and/or managed in or by one or more servers 175-192 of the network element layer 120.

According to another embodiment of the present invention, the architecture can further comprise a system audit tool 140 communicatively coupled with the bus 150 of the transport layer 110. The system audit tool 140 can be adapted to monitor common language messages on the bus 150.

Therefore, in use, the bus 150 provides a common representation of services or information available to, from, and between the end devices 125-136 regardless of the type of end device or the server providing or receiving the information or service. This common representation is in the form of a number of common language messages. The type, number, format, etc. of the common language messages can vary widely depending upon the exact implementation without departing from the scope of the present invention. However, for illustrative purposes only, some exemplary messages will be described.

According to one embodiment, the common language messages can include a "InitiateCommunication" request message indicating a request to initiate a communication. Similarly, the common language messages can include a "InitiateCommunication" response message acknowledging initiation of a communication. According to another embodiment, the common language messages can include a "Call Information" request indicating a request for information relating to a communication and a "Call Information" response providing requested information. The common language messages can also include a "Call Event Notification" message indicating the occurrence of a communication.

In some cases, the common language messages can include an "Update Profile" message indicating a change to one or more user defined preferences. As indicated above, such a message can be useful in updating one or more entries in the user profile database 170 or in one or more servers 175-192 of the network element layer 120. Furthermore, such a message may be useful in informing other devices of a change. Alternatively or additionally, the common language messages may also include, according to one embodiment, a "GetUserProfile" request message used to request user preference information from the user profile database 170 and/or one or more servers 175-192 of the network element layer 120. In such a case, the common language messages may also include a "GetUserProfile" response message that, as will be seen, can be used to respond to a "GetUserProfile" request message with general and/or specific preference information for one or more end devices 125-136 of the interface layer 105.

The various types of message can take any of a variety of possible formats without departing from the scope of the present invention. However, for illustrative purposes only, an exemplary format for a message may be considered to include a header and a body. The header may include information such as any or all of: an address or other indication of the device or devices for which the message is intended; an address or other indication of the device originating the message; an indication of the message type; an indications of the type of contents in the message; etc. The message body may include information such as representation of or actual content to be transferred. Therefore, the body can contain an email message, an audio or video file, a hyperlink or other direction to a location of the actual content, a list or other corpus of preference information etc. However, once again, the exact format of the common language messages can vary widely depending on the exact implementation.

Regardless of the exact format, translating content to a common language message or generating a common language message can comprise generating a file, such as an XML file, of the appropriate format to indicate the type of message and the end devices for which it is intended and possibly an indication of the contents. Alternatively, as indicated above, various components of the architecture may be implemented using object-oriented programming techniques. In such a case, generating a common language message can comprise instantiating an object of a particular class type, such as a "GetUserProfile" object, with properties representing, among other possibilities, the content of data to be communicated, the intended recipient(s), etc.

According to one embodiment, the common language messages can include a "GetUserProfile" request message indicating a request to retrieve and/or change a profile setting. Such a message can be initiated by one of the end devices 125-140 and sent via the bus 150 of the transport layer 110 to a manager 160 or 165 coupled with a server 175-192 providing a service to that end device and storing and/or managing user preference information related to that service or the content provided by that service.

The managers 160-166 and/or user profile database 170 can receive the "GetUserProfile" request message, lookup or read the requested preference information, and respond to the request with a "GetUserProfile" response message containing the requested preference information. That is, each manager 160-166 can be adapted to receive, via the communications bus 150, a request for user preference information. The request can originate, for example, from a requesting end device of the plurality of end devices 125-136. The manager, upon receipt of the request, can identify one or more servers from the plurality of servers 175-192 storing preference information for a user associated with the requesting end device. The manager can then read the preference information for the user associated with the requesting end device from the one or more servers. Additionally or alternatively, the manager can read preference information from the user profile database. After reading preference information from the server and/or user profile database, the manager can generate a response message that include the preference information. The manager can then send the response message to one or more recipient end devices via the communications bus. The one or more recipient end devices can include the requesting end device and/or any number of other end devices, managers, servers, the user profile database, etc. The recipient end devices can be adapted to update user preference information stored thereon based on the response message. In the case that a client controller is a recipient, the client controller can be adapted to translate the common language message to a format specific to each of the devices it controls prior to updating the user preference information on the devices.

According to one embodiment of the present invention, each manager can be further adapted to identify a user associated with the requesting end device prior to identifying one or more servers storing preference information for the user associated with the requesting end device. The user can be identified based on device identifier, a user identifier, an IP address, or other information associated with the requesting device and/or the user of that device. In such a case, identifying one or more servers storing preference information for the user associated with the requesting end device can be based on identifying the user associated with the requesting end device.

According to another embodiment of the present invention and as introduced above, the user profile database 170 can be adapted to store preference information for the user associated with the requesting end device. In some cases, preference information stored in the user profile database 170 can comprise general preference information applicable to multiple end devices associated with the user associated with the requesting end device while the preference information stored by the servers can comprise specific preference information applicable to the requesting end device. In other implementations, the user profile database may store some or all specific preference information while the servers may store some or all general preference information. According to one embodiment, the manager can be further adapted to determine whether there is specific preference information for the user associated with the requesting end device stored in one or more of the servers. In such a case, generating the response message and sending the response message can be performed in response to determining there is specific preference information for the user associated with the requesting end device stored in the one or more servers.

Figure 2:
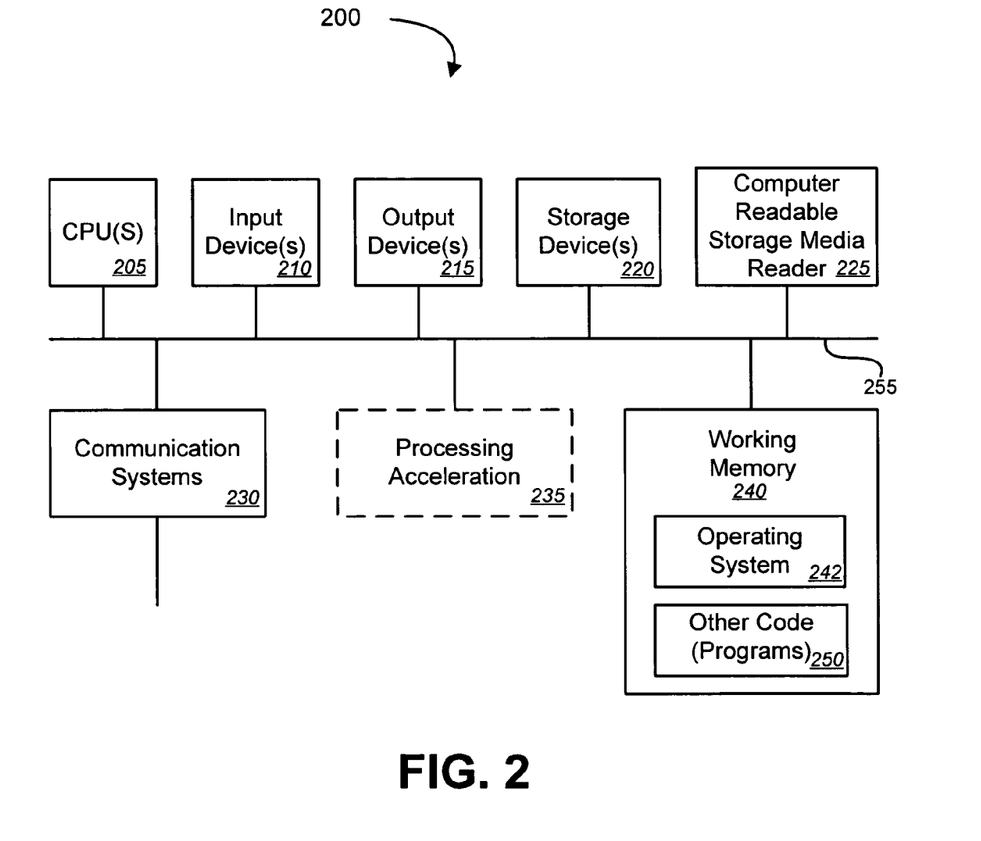
FIG. 2 is a block diagram illustrating an exemplary computer system in which embodiments of the present invention may be implemented.

FIG. 2 is a block diagram illustrating an exemplary computer system in which embodiments of the present invention may be implemented. This example illustrates a computer system 200 such as may be used, in whole, in part, or with various modifications, to provide a server, manager, end device, system audit tool or other system providing function such as those discussed above.

The computer system 200 is shown comprising hardware elements that may be electrically coupled via a bus 255. The hardware elements may include one or more central processing units (CPUs) 205, one or more input devices 210 (e.g., a mouse, a keyboard, etc.), and one or more output devices 215 (e.g., a display device, a printer, etc.). The computer system 200 may also include one or more storage device 220. By way of example, storage device(s) 220 may be disk drives, optical storage devices, solid-state storage device such as a random access memory ("RAM") and/or a read-only memory ("ROM"), which can be programmable, flash-updateable and/or the like.

The computer system 200 may additionally include a computer-readable storage media reader 225, a communications system 230 (e.g., a modem, a network card (wireless or wired), an infra-red communication device, etc.), and working memory 240, which may include RAM and ROM devices as described above. In some embodiments, the computer system 200 may also include a processing acceleration unit 235, which can include a DSP, a special-purpose processor and/or the like.

The computer-readable storage media reader 225 can further be connected to a computer-readable storage medium, together (and, optionally, in combination with storage device(s) 220) comprehensively representing remote, local, fixed, and/or removable storage devices plus storage media for temporarily and/or more permanently containing computer-readable information. The communications system 230 may permit data to be exchanged with the network 220 and/or any other computer described above with respect to the system 200.

The computer system 200 may also comprise software elements, shown as being currently located within a working memory 240, including an operating system 245 and/or other code 250. It should be appreciated that alternate embodiments of a computer system 200 may have numerous variations from that described above. For example, customized hardware might also be used and/or particular elements might be implemented in hardware, software (including portable software, such as applets), or both. Further, connection to other computing devices such as network input/output devices may be employed.

Software of computer system 200 may include code 250 for implementing any or all of the function of the various elements of the architecture as described herein. For example, software, stored on and/or executed by a computer system such as system 200, can provide the functions of the system audit tool, a manager, an end device, etc. Methods implemented by software on some of these components will be discussed in detail below.

Figure 3:
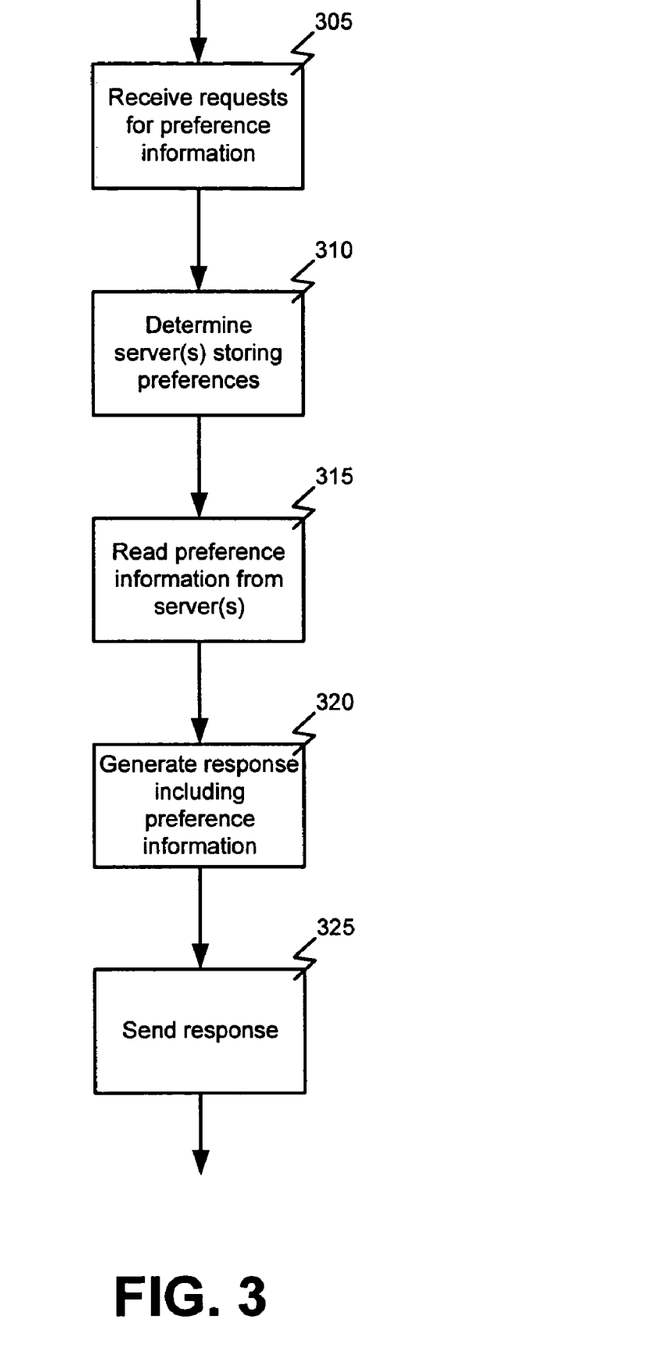
FIG. 3 is a flowchart illustrating, at a high level, a process for providing propagation of user preferences to multiple end devices of potentially diverse types according to one embodiment of the present invention.

FIG. 3 is a flowchart illustrating, at a high level, a process for providing propagation of user preferences to multiple end devices of potentially diverse types according to one embodiment of the present invention. In this example, the process begins with one or more of the managers or the user profile database receiving 305 a request for user preference information such as a "GetUserProfile" request message as discussed above. As noted above, the request can originate from a requesting end device such as when a periodic update is performed, the user requests an update, the user sets some new preference information, a device is powered up, etc.

Upon receiving 305 the request, the manager can identify 310 one or more servers storing preference information for a user associated with the requesting end device. The server can be determined based on the type of device making the request, a service associated with that device or user of the device, the user associated with the requesting end device, etc. The user can be identified based on a device identifier, a user identifier, an IP address, or other information associated with the requesting device and/or the user of that device. For example, information identifying the requesting end device and/or the user associated with the requesting end device may be included in the request message.

The preference information for the user associated with the requesting end device can be read 315 from the one or more servers and/or the user profile database and a response message can be generated 320 including the preference information, i.e., general preference information and/or specific preference information, for the user associated with the requesting end device from the one or more servers and/or user profile database. Generating a response message can comprise generating a common language message, such as a "GetUserProfile" response as discussed above, readable by a plurality of end devices of different types such as, for example, an extensible Markup Language (XML) file. As discussed above, according to one embodiment of the present invention, the manager may be implemented using object-oriented programming techniques. In such a case, the manager can send a common language message by instantiating an object of a particular class type, such as a "GetUserProfile"

response object, with properties representing, among other possibilities, the preference data.

Finally, the response message can be sent 325 to one or more recipient end devices. The one or more recipient end devices may or may not include the requesting end device and/or any number of other end devices. As discussed above, according to one embodiment of the present invention, the bus, application framework, and or software of the end device may be implemented using object-oriented programming techniques. In such a case, the bus or application manager can send a common language message to an end device by instantiating on the end device an object of a particular class type, such as a "GetUserProfile" response object, with properties representing, among other possibilities, the content of data to be communicated, etc.

Figure 4:
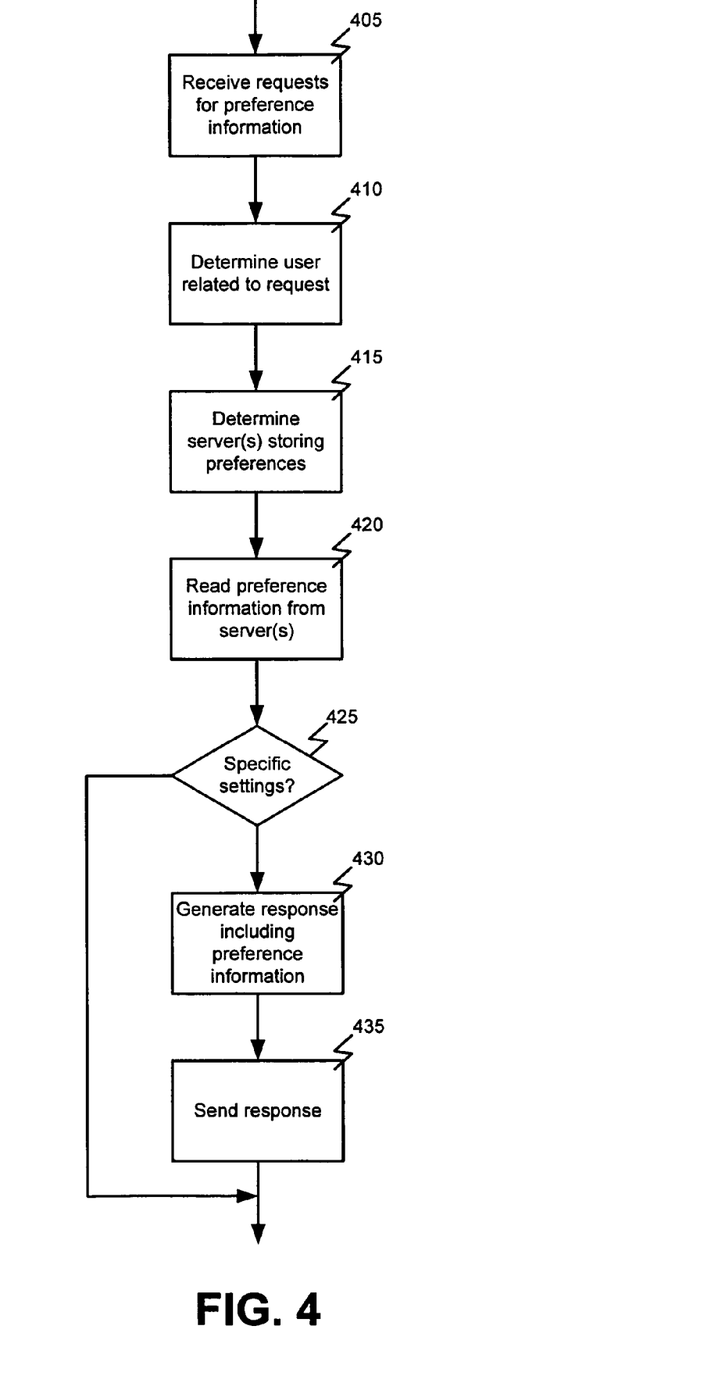
FIG. 4 is a flowchart illustrating additional details of a process for providing propagation of user preferences to multiple end devices of potentially diverse types according to an alternative embodiment of the present invention.

FIG. 4 is a flowchart illustrating additional details of a process for providing propagation of user preferences to multiple end devices of potentially diverse types according to an alternative embodiment of the present invention. As with the previous example, the process begins with one or more of the managers or the user profile database receiving 405 a request for user preference information such as a "GetUserProfile" request message as discussed above. As noted above, the request can originate from a requesting end device such as when a periodic update is performed, the user requests an update, the user sets some new preference information, a device is powered up, etc.

Upon receiving 405 the request, the user associated with the requesting end device can be identified 410. The user can be identified 410 based a device identifier, a user identifier, an IP address, or other information associated with the requesting device and/or the user of that device. For example, information identifying the requesting end device and/or the user associated with the requesting end device may be included in the request message.

The manager can identify 415 one or more servers storing preference information for a user associated with the requesting end device. The server can be determined 415 based on the type of device making the request, a service associated with that device or user of the device, the user associated with the requesting end device, etc. That is, identifying one or more servers storing preference information for the user associated with the requesting end device can be based on identifying the user associated with the requesting end device.

The preference information for the user associated with the requesting end device can be read 420 from the one or more servers and/or the user profile database. As noted above, the preference information for the user associated with the requesting end device can comprise general preference information applicable to multiple end devices associated with the user associated with the requesting end device and/or specific preference information applicable to the requesting end device. According to one embodiment of the present invention, a determination can be made 425 whether there is specific preference information for the user associated with the requesting end device stored in the one or more servers. That is, rather than including general preference information from the server and/or user profile database as in the example discussed with reference to FIG. 3, this example includes only specific preference information in the response.

In response to determining that specific preference information for the user associated with the requesting end device is present, a response message can be generated 430 including the preference information for the user associated with the requesting end device from the one or more servers. Generating 430 a response message can comprise generating a common language message, such as a "GetUserProfile" response as discussed above, readable by a plurality of end devices of different types such as, for example, an eXtensible Markup Language (XML) file. As discussed above, according to one embodiment of the present invention, the manager may be implemented using object-oriented programming techniques. In such a case, the manager can send a common language message by instantiating an object of a particular class type, such as a "GetUserProfile" response object, with properties representing, among other possibilities, the preference data.

Finally, the response message can be sent 435 to one or more recipient end devices. The one or more recipient end devices may or may not include the requesting end device and/or any number of other end devices. As discussed above, according to one embodiment of the present invention, the bus, application framework, and or software of the end device may be implemented using object-oriented programming techniques. In such a case, the bus or application manager can send a common language message to an end device by instantiating on the end device an object of a particular class type, such as a "GetUserProfile" response object, with properties representing, among other possibilities, the content of data to be communicated, etc.

Figure 5:
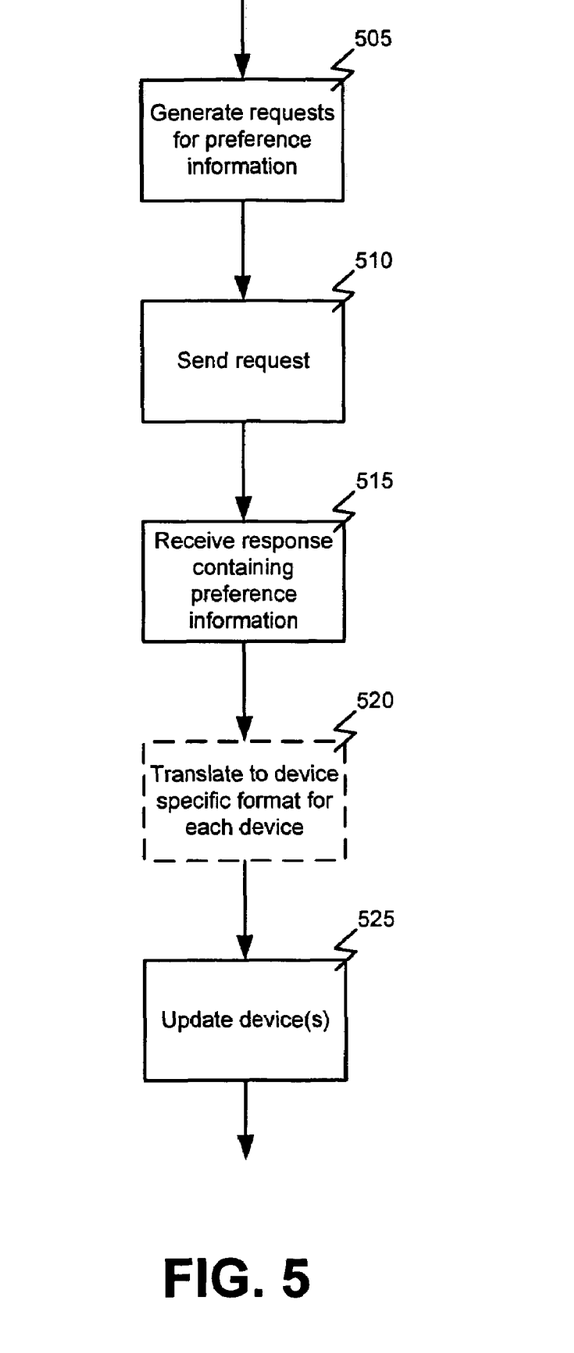
FIG. 5 is a flowchart illustrating a process for updating user preferences on one or more end devices according to one embodiment of the present invention.

FIG. 5 is a flowchart illustrating a process for updating user preferences on one or more end devices according to one embodiment of the present invention. In this example, the requesting end device can generate 505 a request for preference information. The request can be generated 505 in response to any of a number of periodic or other events such as when a periodic update is performed, the user requests an update, the user sets some new preference information, a device is powered up, etc. As discussed above, according to one embodiment of the present invention, the software of the end device may be implemented using object-oriented programming techniques. In such a case, the end device can send 510 a common language message by instantiating an object of a particular class type, such as a "GetUserProfile" request object, with properties representing, among other possibilities, the content of data to be communicated, the intended recipient(s), etc.

In response to the request, the end device can receive 515 the response containing the requested preference information. A noted above the response can also be in the form of a common language message such as a "GetUserProfile" response. Again, the software of the end device may be implemented using object-oriented programming techniques. In such a case, the end device can receive a common language message by instantiating an object of a particular class type, such as a "GetUserProfile" response object, with properties representing, among other possibilities, the content of data to be communicated, the intended recipient(s), etc.

In the event that the end device is a client controller or other end device that does not directly utilize the response message, the end device can optionally translate the common language message to a format specific to one or more recipient end devices prior to updating 525 the user preference information on the one or more recipient end devices.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A method of propagating user preferences to a plurality of end devices, the method comprising:
   receiving a request for user preference information, the request originating from a requesting end device of the plurality of end devices;
   identifying one or more servers storing preference information for a user associated with the requesting end device;
   reading the preference information for the user associated with the requesting end device from the one or more servers;
   generating a response message including the preference information for the user associated with the requesting end device from the one or more servers, wherein the response message comprises a common language message readable by each of the plurality of end devices and wherein each of the plurality of end devices are of different types and wherein generating the response message including the preference information comprises instantiating an object having properties representing one or more preference settings;
   sending the response message to each of the plurality of end devices;
   updating user preference settings on each of the plurality of end devices based on values of the properties of the response message;
   wherein the preference information for the user associated with the requesting end device comprises general preference information and specific preference information wherein the general preference information is stored in a central user profile database and comprises one or more settings applicable to a plurality of services or devices and the specific preference information is stored in the one or more servers and comprises one or more settings applicable only to a service provided by each of the one or more servers; and
   determining whether there is specific preference information for the user associated with the requesting end device stored in the one or more servers and wherein generating the response message and sending the response message is performed in response to determining there is specific preference information for the user associated with the requesting end device stored in the one or more servers.

2. The method of claim 1, wherein the common language message comprises an eXtensible Markup Language (XML) file.

3. The method of claim 1, further comprising identifying a user associated with the requesting end device prior to identifying one or more servers storing preference information for the user associated with the requesting end device.

4. The method of claim 3, wherein identifying one or more servers storing preference information for the user associated with the requesting end device is based on identifying the user associated with the requesting end device.

5. The method of claim 1, further comprising translating the common language message to a format specific to each of the end devices prior to updating the user preference settings on the end devices.

6. A system for propagating user preferences to end devices, the system comprising:
   a communications bus;
   a plurality of end devices of different types, each end device communicatively coupled with the communications bus and configured to send and receive common language messages via the communications bus and to translate common language messages received from the communications bus to a format specific to the end device based on the type;
   a plurality of servers configured to provide services and information to the plurality of end devices and to store user preference information;
   one or more managers, each manager communicatively coupled with the communications bus and at least one of the plurality of servers, wherein each manager is configured to receive via the communications bus a request for user preference information the request originating from a requesting end device of the plurality of end devices, identify one or more servers from the plurality of servers storing preference information for a user associated with the requesting end device, read the preference information for the user associated with the requesting end device from the one or more servers, generate a response message including the preference information for the user associated with the requesting end device from the one or more servers, wherein the response message comprises a common language message readable by each of the plurality of end devices and wherein each of the plurality of end devices are of different types and wherein generating the response message including the preference information comprises instantiating an object having properties representing one or more preference settings, and send the response message to each of the plurality of end devices via the communications bus, wherein each of the plurality of end devices are configured to update user preference settings stored thereon based on values of the properties of the response message;
   a user profile database configured to store preference information, wherein the preference information for the user associated with the requesting end device stored by the user profile database comprises general preference information applicable to a plurality of services or devices, wherein the user preference information stored by the plurality of servers comprises specific preference information applicable only to a service provided by each of the servers, and wherein the response message includes both general preference information and specific preference information; and
   wherein each manager is further configured to determine whether there is specific preference information for the user associated with the requesting end device stored in one or more of the servers, wherein generating the response message and sending the response message is performed in response to determining there is specific preference information for the user associated with the requesting end device stored in the one or more servers.

7. The system of claim 6, wherein the common language message comprises an eXtensible Markup Language (XML) file.

8. The system of claim 6, wherein each manager is further configured to identify a user associated with the requesting end device prior to identifying one or more servers storing preference information for the user associated with the requesting end device.

9. The system of claim 8, wherein identifying one or more servers storing preference information for the user associated with the requesting end device is based on identifying the user associated with the requesting end device.

10. The system of claim 6, further comprising a client controller communicatively coupled with the communications bus and one or more of the plurality of end devices and configured to translate the common language message to a format specific to each of the one or more recipient end devices prior to updating the user preference settings on the one or more recipient end devices.

11. A machine-readable medium having stored thereon a series of instructions that, when executed by a processor, cause the processor to propagate user preferences to a plurality of end devices by:
   receiving a request for user preference information, the request originating from a requesting end device of the plurality of end devices;
   identifying one or more servers storing preference information for a user associated with the requesting end device;
   reading the preference information for the user associated with the requesting end device from the one or more servers;
   generating a response message including the preference information for the user associated with the requesting end device from the one or more servers, wherein the response message comprises a common language message readable by each of the plurality of end devices and wherein each of the plurality of end devices are of different types and wherein generating the response message including the preference information comprises instantiating an object having properties representing one or more preference settings;
   sending the response message to each of the plurality of end devices;
   updating user preference settings on each of the plurality of end devices based on values of the properties of the response message;
   wherein the preference information for the user associated with the requesting end device comprises general preference information and specific preference information wherein the general preference information is stored in a central user profile database and comprises one or more settings applicable to a plurality of services or devices and the specific preference information is stored in the one or more servers and comprises one or more settings applicable only to a service provided by each of the one or more servers; and
   determining whether there is specific preference information for the user associated with the requesting end device stored in the one or more servers and wherein generating the response message and sending the response message is performed in response to determining there is specific preference information for the user associated with the requesting end device stored in the one or more servers.

12. The machine-readable medium of claim 11, further comprising identifying a user associated with the requesting end device prior to identifying one or more servers storing preference information for the user associated with the requesting end device.

13. The machine-readable medium of claim 12, wherein identifying one or more servers storing preference information for the user associated with the requesting end device is based on identifying the user associated with the requesting end device.

14. The machine-readable medium of claim 11, further comprising translating the common language message to a format specific to each of the end devices prior to updating the user preference settings on the end devices.

* * * * *

UNITED STATES PATENT AND TRADEMARK OFFICE
CERTIFICATE OF CORRECTION

| | | |
|---|---|---|
| PATENT NO. | : 7,676,473 B2 | Page 1 of 1 |
| APPLICATION NO. | : 11/293028 | |
| DATED | : March 9, 2010 | |
| INVENTOR(S) | : Jordan Alperin et al. | |

It is certified that error appears in the above-identified patent and that said Letters Patent is hereby corrected as shown below:

Column 8, Line 11, delete "type; an indications of the" and insert --type; an indication of the--, therefor.

Column 11, Line 8, replace "and or" with "and/or", therefor.

Column 11, Line 30, delete "based a device" and insert --based on a device--, therefor.

Column 12, Line 43, delete "A noted above" and insert --As noted above--, therefor.

Signed and Sealed this

Eighteenth Day of May, 2010

David J. Kappos
*Director of the United States Patent and Trademark Office*